United States Patent [19]

McKinnon

[11] Patent Number: 4,852,602
[45] Date of Patent: Aug. 1, 1989

[54] RISER CHECK VALVE

[76] Inventor: Robert M. McKinnon, P.O. Box 648, Bedford, Tex. 76021

[21] Appl. No.: 189,776

[22] Filed: May 3, 1988

[51] Int. Cl.[4] ............................................. F16K 15/02
[52] U.S. Cl. .................................. 137/68.1; 137/513.5
[58] Field of Search .............. 137/68.1, 71, 312, 513.5

[56] References Cited

U.S. PATENT DOCUMENTS

| 2,804,317 | 8/1957 | Prater | 137/68.1 |
| 4,364,407 | 12/1982 | Hilliard | 137/71 |
| 4,562,962 | 1/1986 | Hartman | 137/68.1 X |
| 4,762,140 | 8/1988 | Davis | 137/68.1 X |

FOREIGN PATENT DOCUMENTS 2139326  11/1984  United Kingdom ............. 137/513.5

Primary Examiner—John Fox
Attorney, Agent, or Firm—Arthur F. Zobal

[57] ABSTRACT

There is disclosed a check valve apparatus for use with risers in an irrigation system. The valve apparatus stops the flow of water when the respective riser is broken away from the water supply conduit. The valve apparatus has a conduit member and a valve member. The conduit member has an opening extending therethrough and between the ends of the conduit member. A shoulder positioned intermediate the conduit member ends projects inwardly. The valve member seats on the shoulder, wherein it is in the open position. When the riser is subjected to a sufficient amount of force, the coupling member severs at a weakened portion, thereby severing the shoulder and allowing the valve member to close to minimize the flow of water.

23 Claims, 2 Drawing Sheets

RISER CHECK VALVE

BACKGROUND OF THE INVENTION

1. Field of the Invention

The invention relates to a valve apparatus for use in an irrigation system having sprinkler or shrub risers.

2. Description of the Prior Art

In present day lawn and shrub irrigation systems, risers connected to an underground pipe extend upward above the surface of the ground to which sprinkler heads are attached for irrigation purposes. Many times the risers are broken off, resulting in large and unregulated amounts of water spraying outward causing water waste, reduced irrigation system pressure, and liability problems if the water is sprayed onto streets and sidewalks.

SUMMARY OF THE INVENTION

It is an object of the invention to provide an apparatus to be coupled to risers in an irrigation system which eliminates or minimizes the problems mentioned above.

The apparatus comprises a conduit member to be coupled between a water supply conduit and a water discharge conduit or riser. The conduit member has a weakened portion adapted to break if sufficient force is applied to its end to which the riser is coupled. In addition, the conduit member comprises a valve means and structure which allows normal flow of water from the water supply conduit to the riser under normal conditions but which limits the flow of water through the conduit member to a small tell-tale stream in the event that the conduit member is broken at its weakened portion.

DESCRIPTION OF THE PREFERRED EMBODIMENT

Figure 1:
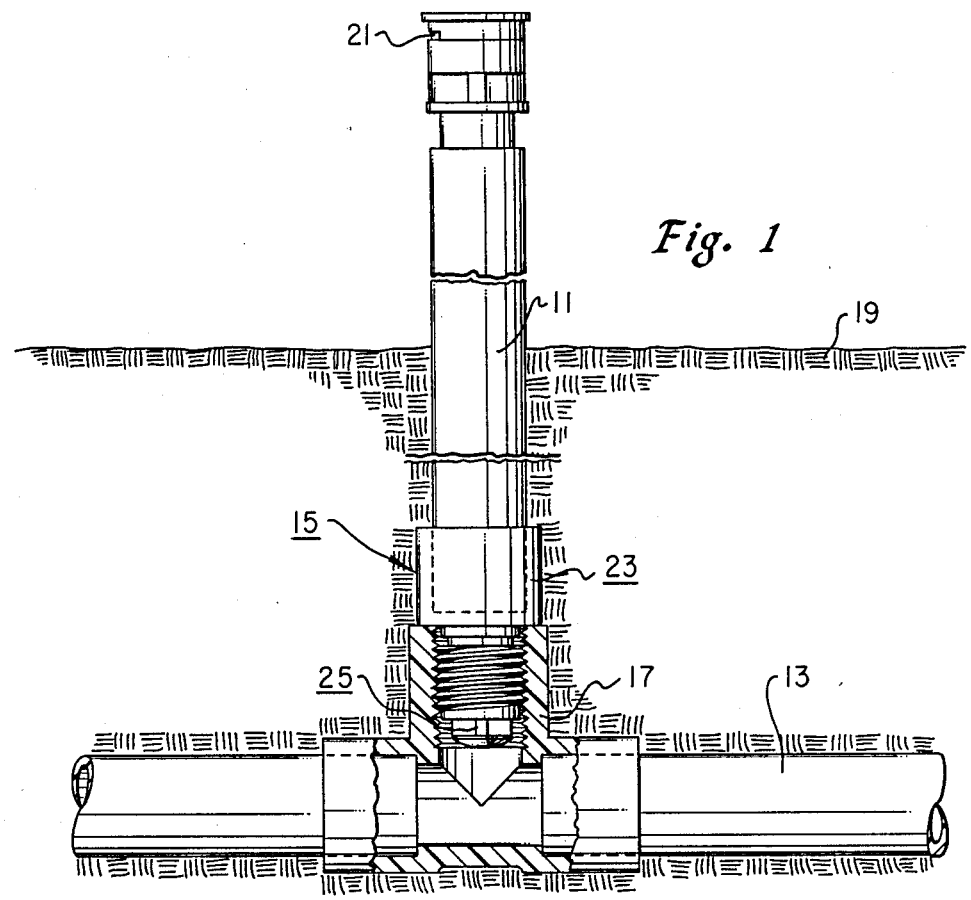
FIG. 1 is a partial cross-section of the apparatus of the invention coupled to an underground water supply pipe and to a riser having a sprinkler head coupled to its upper end.

In FIG. 1 there is shown a partial cross-sectional view of the conjunction of a riser 11 and an underground water supply pipe 13 of an irrigation system, in which a riser check valve apparatus 15 of the present invention, in accordance with a preferred embodiment, has been installed. The riser 11 is connected to the underground water supply pipe 13 by the valve apparatus 15 and a conventional T-fitting 17 at some depth below the surface of the ground 19. At the upper end of the riser is a sprinkler head nozzle 21 for dispersing water. The valve apparatus 15 of the present invention includes a conduit member 23 and a valve member 25.

Figure 2:
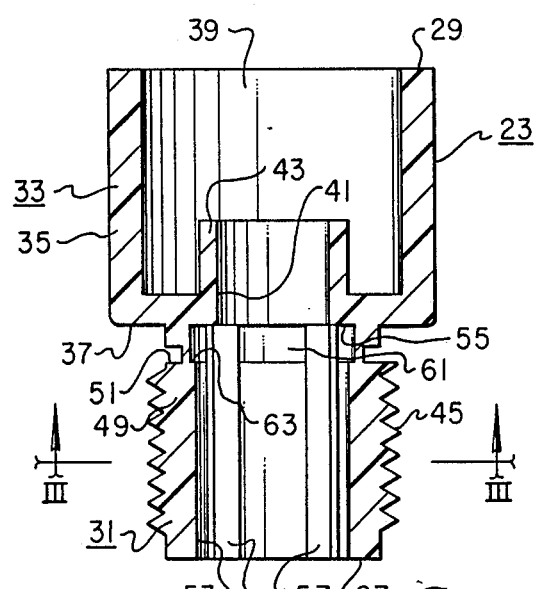
FIG. 2 is a cross-sectional view of the conduit member or shell of the apparatus of the invention.
Figure 3:
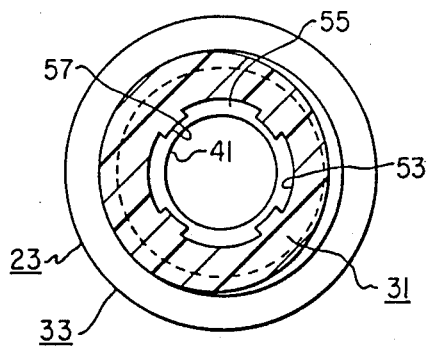
FIG. 3 is a cross-sectional view of FIG. 2 taken along the lines III—III thereof.

Referring to FIGS. 2 and 3, the conduit member 23 in general includes wall structure 35, 37, 49 that forms an opening 39, 41, 53 extending through the conduit member between the opposite first and second ends 27, 29 thereof. The first end portion, which hereinafter is referred to as the fitting coupling portion 31, is adapted to be connected to a water supply conduit. In the preferred embodiment, the fitting coupling portion 31 is connected to the fitting 17, which in turn is connected to the water supply pipe 15. The second end portion, which is hereinafter referred to as the riser coupling portion 33, is adapted to be connected to a water discharge conduit. In the preferred embodiment, the water discharge conduit is the riser 11.

The cylindrical riser coupling portion 33 is cup shaped, having a side wall 35, an end wall 37, and an interior cavity 39. The end wall 37 has a centrally located circular opening 41 extending therethrough. The circular opening 41 is surrounded by a flange 43 that extends into the interior cavity 39 and is integral to the end wall 37.

Figure 5:
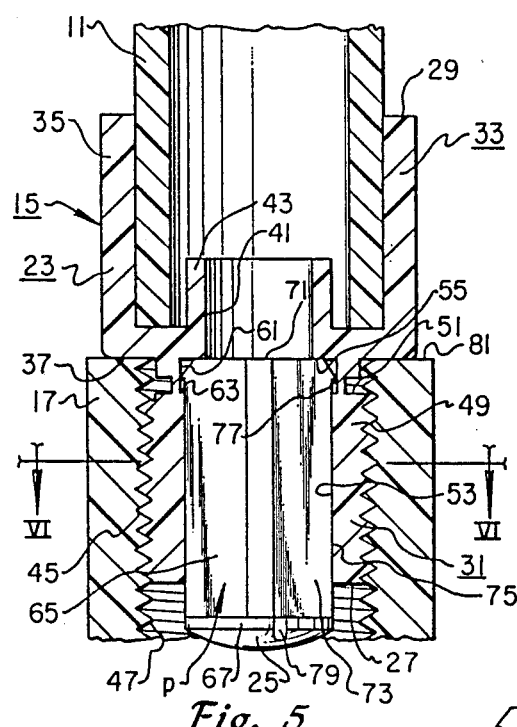
FIG. 5 is a cross-sectional view of a conduit member of FIG. 2 with the valve of FIG. 4 located therein in an open position.

The generally cylindrical fitting coupling portion 31 is integrally joined to the riser coupling portion end wall 37 and has exterior threads 45 for matingly engaging interior threads 47 of the fitting 17 (see FIG. 5). The outside diameter of the riser coupling portion side wall 35 is larger than the outside diameter of the fitting coupling portion 31. The outer surface of the wall 49 of the fitting coupling portion 31 has a circumferential groove 51 located near the juncture of the fitting coupling portion 31 and the riser coupling portion 33. The groove 51 reduces the thickness of the wall of the fitting coupling portion 31 so as to form a weakened portion in the wall 49. The fitting coupling portion 31 has a central bore 53 that extends from the first end 27 to the riser coupling portion end wall 37. The diameter of the central bore 53 is larger than the diameter of the opening 41 in the end wall 37, thereby forming a valve member seating shoulder 55. The groove 51 is located closer to the first end 27 of the conduit member 23 than is the shoulder 55. The central bore 53 has a plurality of inwardly extending longitudinal ridges 57 that extend the length of the central bore 53 and that are angularly spaced apart. The interior surface of the central bore 53 has a shallow channel 61 located near the valve member seating shoulder 55. The channel 61, which forms a shoulder 63, extends circumferentially around the central bore 53 and between the ridges 57.

Figure 4:
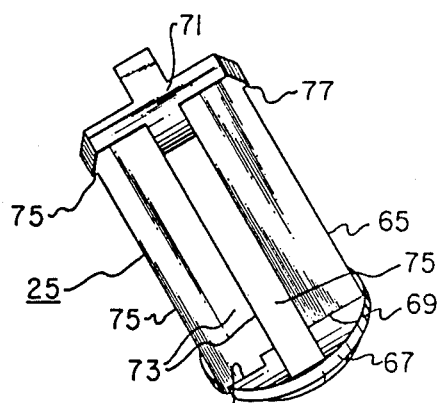
FIG. 4 is an isometric view of the valve member employed in the conduit member of FIG. 2 of the apparatus of the invention.

Referring now to FIGS. 4 and 5, the valve member 25 includes a wall portion 65 and a closure cap portion 67. The wall portion 65 has first and second ends 69, 71, with the distance between the wall portion ends being greater than the length of the fitting coupling portion central bore 53, such that when the valve member 25 is installed into the central bore, the first end 69 of the wall portion protrudes from the fitting coupling portion. The second end 71 of the wall portion 65 is planar which allows the valve member 25 to seat onto the shoulder 55. The wall portion 65 includes two flat plates 73 that perpendicularly bisect one another. Each plate has respective side edges 75. One of the plates has small barbs 77 on each of its side edges 75 near the second end 71. The barbs 77 engage the channel shoulder 63 of the central bore 53 to removably retain the valve member 25 inside of the central bore.

The circular cap portion 67 is integrally joined to the first end 69 of the wall portion 65. The diameter of the cap portion 67 is slightly larger than the distance between the side edges 75 of any given plate 73. The cap portion 67 has a slot 79 therethrough. The location of the slot 79 is such that the plates 73 do not impede the flow of water through the slot.

In the preferred embodiment, the conduit member 23 is made of ABS plastic and the valve member 25 is made of either teflon or PVC. The thickness of the fitting coupling portion wall 49 at the groove 51 is 0.03 inches, while the thickness of the fitting coupling portion wall adjacent to the groove is 0.07 inches. (These dimensions do not include the ridges 57.)

Figure 6:
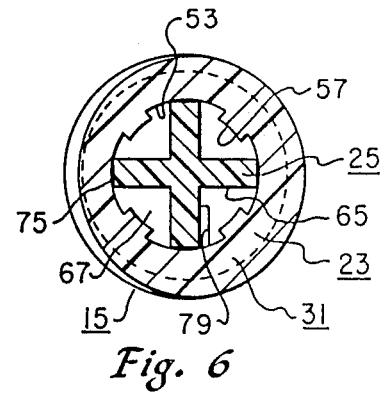
FIG. 6 is a fragmentary cross-sectional view of FIG. 5 taken along the lines VI—VI thereof.

The assembly and installation of the valve apparatus 15 of the present invention is quite simple. First, the first end 69 of the valve member 25 is inserted all of the way into the central bore 53 of the fitting coupling portion 31 until the first end seats up against the shoulder 55. As shown in FIG. 6, the side edges 75 of the wall portion plates 73 slidingly engage the central bore 53 between the ridges 57. The valve member 25 is retained inside of the central bore 53 by the barbs 77 and the corresponding shoulder 63. Next, the valve apparatus 15 is threaded into the respective fitting 17 until the upper end 81 of the fitting abuts the lower portion of the riser coupling portion end wall 37 (see FIG. 5). Teflon tape (not shown) may be used to provide a watertight fit between the valve apparatus 15 and the fitting 17. Finally, the lower end portion of the riser 11 is inserted into the riser coupling portion 33, and specifically into the annular region between the flange 43 and the side wall 35. The riser 1 is solvent welded (not shown) to the riser coupling portion 31 to make a watertight fit.

The operation of the valve apparatus 15 of the present invention will now be described with reference to FIGS. 5 and 7. In FIG. 5, the valve apparatus 15 is shown in the normal or open position, wherein the wall portion second end 71 is seated on the shoulder 55. Passageways P are formed by the cap portion 67, which is located below the first end 27 of the conduit member 23, and the wall portion plates 73. The passageways P lead into the central bore 53 of the fitting coupling portion 31. Thus, water flows from the water supply pipe 13 and fitting 17 into the passageways P, up through the central bore 53 and the circular opening 41, and into the riser 11. The size of the passageways P are sufficient to provide the desired amount of water flow to the riser nozzle 21. In the preferred embodiment, the diameter of the central bore 53 is about 0.5 inches, the thickness of the wall portions of the valve member 25 is about 0.08 inches, and the ridges 57 extend into the central bore 53 about 0.02 inches and are about 0.08 inches wide.

Figure 7:
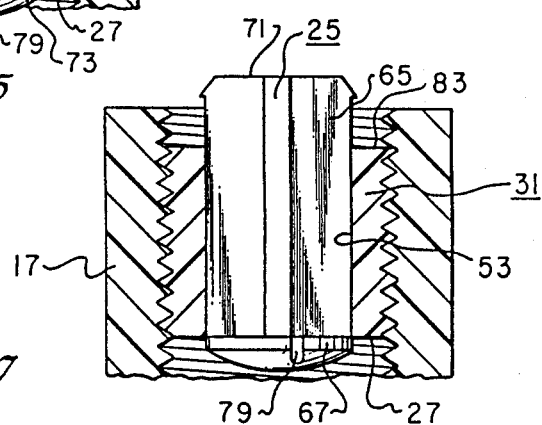
FIG. 7 is a cross-sectional view of the conduit member of FIGS. 2 and 5 which has been severed along a groove formed in the outer wall thereof and with the valve of FIG. 4 located in a closed position.

When the riser 11 is subjected to a sufficient amount of force, whether through bumping, striking, or the like, the conduit member 23 will sever at the groove 51 wherein a severed end 83 is formed on the fitting coupling portion 31 at the groove 51 and the shoulder 55 is severed from the remainder of the coupling portion (see FIG. 7). With the shoulder 55 now removed, water pressure forces the valve member 25 up inside of the fitting coupling portion central bore 53, where the cap portion 67 seats onto the first end 27 of the fitting coupling portion 31. With the exception of the slot 79, all of the passageways are closed by the cap portion, thereby stopping the flow of water. The slot allows a relatively small amount of water to pass through the valve. This small amount of water shoots up above the ground to form a telltale stream which indicates the broken condition of the riser. To install a new riser, the fitting coupling portion 31 of the valve apparatus 15 is removed from the fitting 17 and a new valve apparatus and riser are installed as described above.

Installing the valve apparatus 15 into the fitting 17 such that the upper end 81 of the fitting abuts the end wall 37 of the riser coupling portion 33, provides additional structural integrity to the valve apparatus by increasing the amount of force required to sever the conduit member.

Although the valve apparatus has been described as having exterior threads 45 to matingly engage the interior threads 47 of the fitting 17, the exterior of the fitting coupling portion 31 of the valve apparatus may be provided with a smooth surface instead of threads. In such a case, the valve apparatus would be solvent welded into the fitting.

The valve member 25 need not have a slot 79 or any opening in the cap portion 67, wherein when the valve is in the closed position, all but a trace of water flow is stopped.

The foregoing disclosure and the showing made in the drawing are merely illustrative of the principles of this invention and are not to be interpreted in a limiting sense.

I claim:

1. An apparatus for use in an irrigation system, comprising:

a conduit member comprising wall structure forming an opening extending through said conduit member between first and second opposite ends thereof, said first end being adapted to be connected to a water supply conduit and said second end being adapted to be connected to a water discharge conduit, seat means located in said opening intermediate said first and second opposite ends, a valve means having a closure means at one end and wall means extending from said closure means to a seating end, said wall means of said valve means having a length from said seating end to said closure means which is greater than the distance from said seat means to said first end of said conduit member and having a size sufficient to be located in said opening of said conduit member and positioned with said seating end of said wall means engaging said seat means and with said closure means extending beyond said first end of said conduit member such that said closure means is spaced from said first end of said conduit member defining a first position of said valve means, in said first position of said valve means, passageway means of a given size leads into said opening of said conduit member by way of said first end for the flow of water into said opening of said conduit member for flow through said opening and out of said second end of said conduit member, said wall structure of said conduit member comprising a weakened portion which connects said seat means to said conduit member first end whereby sufficient force applied to said conduit member between said second end and said weakened portion will cause said wall structure to be severed at said weakened portion forming a severed end and severing said seat means from said conduit member first end and allowing water pressure to move said valve means in a direction whereby said closure means may move toward said first end of said conduit member to a given position defining a second position of said valve means, in said second position of said valve means, a passageway exist for the flow of water into said opening by way of said first end of said conduit member which is substantially smaller than said given size of said passageway means allowing a reduced amount of water to flow into said opening by way of said first end of said conduit member.

2. The apparatus of claim 1, wherein said seat means of said conduit member comprises a shoulder extending into said opening of said conduit member from said wall structure.

3. The apparatus of claim 1, wherein said weakened portion comprises a groove formed in the outer surface of said wall structure of said conduit member.

4. The apparatus of claim 3, wherein said seat means of said conduit member comprises a shoulder extending into said opening of said conduit member from said wall structure.

5. The apparatus of claim 3, comprising:

said wall means of said valve means comprises two thin planar portions which cross each other forming a member with a cross-shaped transverse cross-section having an end opposite said seating end which is connected to said closure means and having four angularly spaced apart side edges adapted to slidingly engage the inside of said wall structure of said conduit member.

6. The apparatus of claim 1, comprising:

said wall means of said valve means comprises at least one thin planar portion having an end opposite said seating end which is connected to said closure means across its width and which has two oppositely located side edges adapted to slidingly engage the inside of said wall structure of said conduit member.

7. The apparatus of claim 1, wherein said valve means has retaining means for retaining said valve means inside of said conduit member opening, said valve means retaining means comprising barbs on said wall means that engage a shoulder located inside of said conduit member opening.

8. An apparatus for use in an irrigation system, comprising:

a conduit member comprising wall structure forming a central opening extending through said conduit member between first and second opposite ends thereof, said first end being adapted to be connected to a water supply conduit and said second end being adapted to be connected to a water discharge conduit, seat means located in said central opening intermediate said first and second opposite ends, a valve means having a closure means at one end and wall means extending from said closure means to a seating end, said closure means having a size greater than the size of said central opening at said first end of said conduit member, a small opening extending through said closure means forming a small passageway therethrough, said wall means of said valve means having a length from said seating end to said closure means which is greater than the distance from said seat means to said first end of said conduit member and having a size sufficient to be located in said central opening of said conduit member and positioned with said seating end of said wall means engaging said seat means and with said closure means extending beyond said first end of said conduit member such that said closure means is spaced from said first end of said conduit member defining a first position of said valve means, in said first position of said valve means, a main passageway is formed between said closure means and said first end of said conduit member into said central opening of said conduit member for the flow of water into said central opening of said conduit member for flow through said central opening and out of said second end of said conduit member, the size of said main passageway being much greater than the size of said small passageway, said wall structure of said conduit member comprising a weakened portion located between said seat means and said first end of said conduit member whereby sufficient force applied to said conduit member between said second end and said weakened portion will cause said wall structure to be severed at said weakened portion forming a severed end and severing said seat means from said conduit member first end and allowing water pressure to move said valve means in a direction to cause said closure means to engage said first end of said conduit member defining a second position of said valve means wherein the size of said main passageway into said central opening of said conduit member is minimized, in said second position of said valve means, said small passageway formed by said small opening extending through said closure means allows water to flow into said central opening of the remaining portion of said conduit member for flow out of said severed end of said conduit member in a small stream.

9. The apparatus of claim 8, wherein said seat means of said conduit member comprises a shoulder extending into said opening of said conduit member from said wall structure.

10. The apparatus of claim 8, wherein said weakened portion comprises a groove formed in the outer surface of said wall structure of said conduit member.

11. The apparatus of claim 10, wherein said seat means of said conduit member comprises a shoulder extending into said opening of said conduit member from said wall structure.

12. The apparatus of claim 10, comprising:

said wall means of said valve means comprises two thin planar portions which cross each other forming a cross-shaped member having an end opposite said seating end which is connected to said closure means and having four angularly spaced apart side edges adapted to slidingly engage the inside of said wall structure of said conduit member.

13. The apparatus of claim 12, wherein:

said groove extends around said conduit member.

14. The apparatus of claim 8, comprising:

said wall means of said valve means comprises at least one thin planar portion having an end opposite said seating end which is connected to said closure means across its width and which has two oppositely located side edges adapted to slidingly engage the inside of said wall structure of said conduit member.

15. The apparatus of claim 8, in combination with an irrigation system, comprising:
   a water supply conduit located in the ground,
   a water discharge conduit,
   said first end of said conduit member being connected to said water supply conduit with said second end extending upward,
   said water discharge conduit having a first end connected to said second end of said conduit member and an opposite end extending upward at least to the surface of the ground.

16. The apparatus of claim 8, wherein said valve means has retaining means for retaining said valve means inside of said conduit member opening, said valve means retaining means comprising barbs on said wall means that engage a shoulder located inside of said conduit member opening.

17. An apparatus for use in an irrigation system, comprising:
   a conduit member comprising wall structure forming an opening extending through said conduit member between first and second opposite ends thereof,
   said first end being adapted to be connected to a water supply conduit and said second end being adapted to be connected to a water discharge means,
   seat means located in said opening intermediate said first and second opposite ends,
   a valve means having a closure means at one end and wall means extending from said closure means to a seating end,
   said conduit member comprising closure seating means spaced from said seat means,
   said wall means of said valve means having a length from said seating end to said closure means which is greater than the distance from said seat means to said closure seating means of said conduit member and having a size sufficient to be located in said opening of said conduit member and positioned with said seating end of said wall means engaging said seat means and with said closure means extending beyond said closure seating means of said conduit member such that said closure means is spaced from said closure seating means of said conduit member defining a first position of said valve means,
   in said first position of said valve means, passageway means of a given size leads into said opening of said conduit member by way of said first end for the flow of water into said opening of said conduit member for flow through said opening and out of said second end of said conduit member,
   said wall structure of sad conduit member comprising a weakened portion located between said seat means and said closure seating means which connects said seat means to said conduit member first end whereby sufficient force applied to said conduit member between said second end and said weakened portion will cause said wall structure to be severed at said weakened portion forming a severed end and severing said seat means from said conduit member first end and allowing water pressure to move said valve means in a direction whereby said closure means may move toward said closure seating means of said conduit member to a given position defining a second position of said valve means,
   in said second position of said valve means, a passageway exist for the flow of water into said opening by way of said first end of said conduit member which is substantially smaller than said given size of said passageway means allowing a reduced amount of water to flow into said opening by way of said first end of said conduit member.

18. The apparatus of claim 17, wherein:
   said conduit member between said first and second ends comprises a single integral member with said valve means being insertable into said central opening by way of said first end of said conduit member.

19. The apparatus of claim 18, comprising:
   a shoulder means formed on the inside of said central opening and located near said seat means and between said seat means and said closure seating means,
   said valve means comprising retaining means for retaining said valve means inside of said central opening of said conduit member,
   said valve means retaining means comprising barb means that extend outward that are adapted to engage said shoulder.
   said barb means allowing said valve member to be inserted into said central opening by way of said first end of said conduit member.

20. An apparatus for use in an irrigation system, comprising:
   a conduit member comprising wall structure forming a central opening extending through said conduit member between first and second opposite ends thereof,
   said first end being adapted to be connected to a water supply conduit and said second end being adapted to be connected to a water discharge means,
   seat means located in said central opening intermediate said first and second opposite ends,
   a valve means having a closure means at one end and wall means extending from said closure means to a seating end,
   said closure means having a size greater than the size of said central opening at said first end of said conduit member,
   a small opening extending through said closure means forming a small passageway therethrough,
   said conduit member comprising closure seating means spaced from said seat means,
   said wall means of said valve means having a length from said seating end of said closure means which is greater than the distance from said seat means to said closure seating means of said conduit member and having a size sufficient to be located in said central opening of said conduit member and positioned with said seating end of said wall means engaging said seat means and with said closure means extending beyond said closure seating means of said conduit member such that said closure means is spaced from said closure seating means of said conduit member defining a first position of said valve means,
   in said first position of said valve means, a main passageway is formed between said closure means and said first end of said conduit member into said central opening of said conduit member for the flow of water into said central opening of said conduit member for flow through said central opening and out of said second end of said conduit member, the size of said main passageway being much greater than the size of said small passageway, said wall structure of said conduit member comprising a weakened portion located between said seat means and said closure seating means of said conduit member whereby sufficient force applied to said conduit member between said second end and said weakened portion will cause said wall structure to be severed at said weakened portion forming a severed end and severing said seat means from said conduit member first end and allowing water pressure to move said valve means in a direction to cause closure means to engage said closure seating means of said conduit member defining a second position of said valve means wherein the size of said main passageway into said central opening of said conduit member is minimized, in said second position of said valve means, said small passageway formed by said small opening extending through said closure means allows water to flow into said central opening of the remaining portion of said conduit member for flow out of said severed end of said conduit member in a small stream.

21. The apparatus of claim 20, in combination with an irrigation system, comprising:

a water supply conduit located in the ground, a water discharge conduit, said first end of said conduit member being connected to said water supply conduit with said second end extending upward, said water discharge conduit having a first end connected to said second end of said conduit member and an opposite end extending upward at least to the surface of the ground.

22. The apparatus of claim 20, wherein:

said conduit member between said first and second ends comprises a single integral member with said valve means being insertable into said central opening by way of said first end of said conduit member.

23. The apparatus of claim 22, comprising:

a shoulder means formed on the inside of said central opening and located near said seat means and between said seat means and said closure seating means, said valve means comprising retaining means for retaining said valve means inside of said central opening of said conduit member, said valve means retaining means comprising barb means that extend outward that are adapted to engage said shoulder, said barb means allowing said valve member to be inserted into said central opening by way of said first end of said conduit member.

* * * * *